I. SZAFRANSKI.
TROLLEY POLE CONSTRUCTION.
APPLICATION FILED SEPT. 7, 1917.
1,289,572.
Patented Dec. 31, 1918.
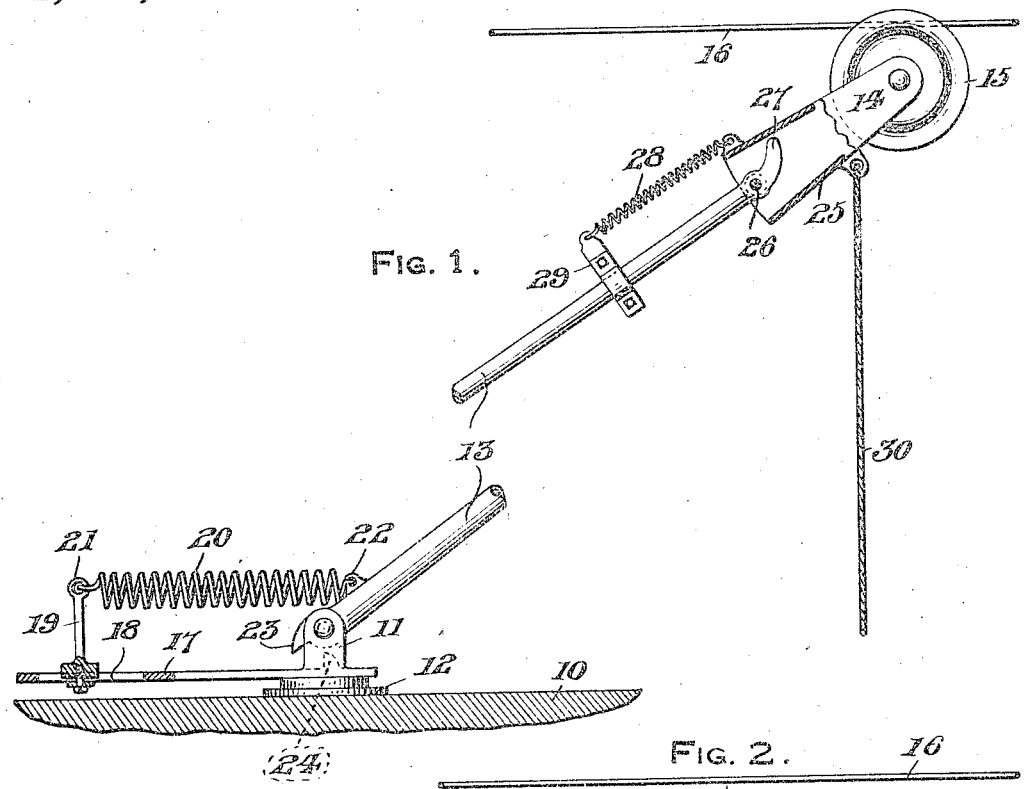
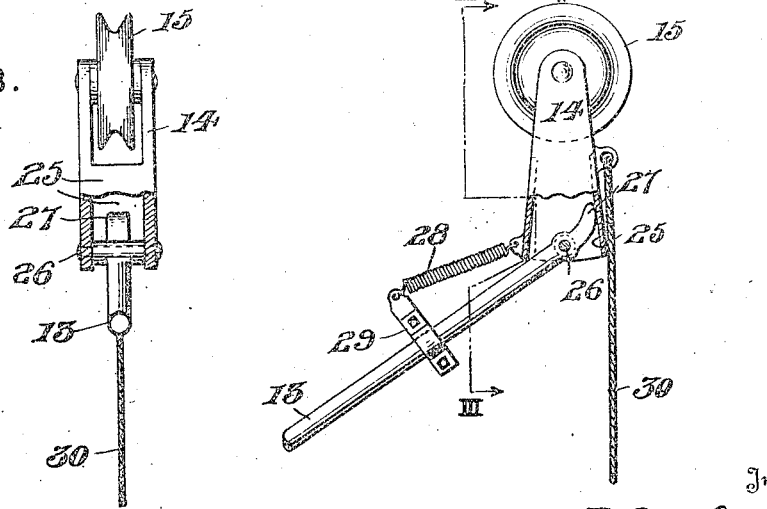
Inventor
I. Szafranski
By  R. M. Wilson
Attorney

UNITED STATES PATENT OFFICE.

IGNAC SZAFRANSKI, OF SCHENECTADY, NEW YORK.

TROLLEY-POLE CONSTRUCTION.

1,289,572.   Specification of Letters Patent.   Patented Dec. 31, 1918.

Application filed September 7, 1917.  Serial No. 190,230.

*To all whom it may concern:*

Be it known that I, IGNAC SZAFRANSKI, a citizen of the United States, residing at Schenectady, in the county of Schenectady and State of New York, have invented certain new and useful Improvements in Trolley-Pole Constructions, of which the following is a specification.

This invention relates to certain new and useful improvements in trolley pole construction.

The primary object of the invention is the provision of a trolley pole for street and mine cars and the like having a plurality of differently tensioned resilient means for operatively positioning the wheel upon the wire, the construction being such that the pole has a swinging movement substantially limited to an arc of 90°.

A further object of the device is the provision of a trolley pole for cars having a harp carried thereby and automatically positionable substantially vertical when the wheel leaves the wire for assisting the operator in replacing the wheel.

This invention provides a trolley pole having springs of different strength adjacent its opposite ends, each of which are adapted for retaining the wheel in its service position upon the wire, the said springs being readily adjustable while both the trolley pole and its harp have limited pivotal movements.

In the drawing forming a part of this application and in which like numerals refer to corresponding parts throughout the several views:

Figure 1 is a side elevation of the device partially broken away illustrated in connection with a portion of a roof of a trolley car.

Fig. 2 is a side elevation of the upper portion of the device with the wheel detached from the wire and parts broken away, and, Fig. 3 is a sectional view taken upon line III—III of Fig. 2.

In the drawing, the portion of a car roof 10 is illustrated having a mounting bracket 11 swiveled upon a block 12 carried by the roof 10 while the trolley pole 13 is swingingly connected at its lower end to the said bracket and a harp 14 is pivotally carried by the upper end of the pole for journaling the mounting wheel 15 adapted for engaging beneath the circuit wire 16.

The bracket 11 has an extension 17 provided with a slot 18 for mounting a post 19 longitudinally adjustably thereon, a spring 20 being connected between the upper end of the said post as at 21 and an eye 22 of the pole 13. It will be understood that when the wheel 15 is in contact with the wire 16, the pole 13 is inclined while the spring 20 tends to move the pole 13 toward its vertical position, coöperating lugs 23 and 24 being carried by the pole and bracket respectively for limiting the swinging movement of the pole to a vertical position, while the pole is capable of swinging downwardly substantially horizontally when inoperatively arranged.

The harp 14 has a hollow base or socket portion 25 within which the upper end of the pole 13 is pivoted as at 26, a finger 27 in the form of an extension of the pole 13 projecting within the socket 25 in curved arrangement adapted for engagement by the opposite sides of the harp for limiting the pivotal swinging movement thereof. A spring 28 of less strength than the spring 20 is connected between the harp 25 and a collar 29 adjustably arranged slidably upon the pole 13. A cord or rope 30 is attached to the pole 13 adjacent the upper end thereof in the usual manner. It will be evident that when the wheel 15 engages the wire 16, the harp 14 will be prevented from swinging vertically by reason of the fact that the spring 20 is of greater strength than the spring 28 and overcomes the force of the latter.

During the operation of the device it will be understood that the wheel 15 is normally positioned upon the wire 16, the spring 28 tending to move the harp 14 upwardly upon its pivot 26 to the position shown in Fig. 2 acting to press the wheel against the wire while the action of the relatively stronger spring 20 has the same effect by exerting an upward influence upon the pole 13 with the harp and wheel carried thereby. When the wheel 15 leaves the wire 16, as shown in Fig. 2, the harp is positioned upright with the finger extension 27 engaging the lower side of the socket 25. This renders it an easy operation to replace the wheel upon the wire and at which times the spring 20 being of greater strength than the spring 28 brings the harp 14 in longitudinal alinement with the pole 13 engaging the upper side of the socket 25 with the extension or stop finger 27.

A serviceable structure possessing great flexibility is provided, the resilient pivoting of the harp 14 permitting the same to yield under the swinging movements of the wire 16 irrespective of the swinging of the pole 13 and this aids the wheel in remaining operatively in engagement with the wire.

What I claim as new is:—

In combination with a trolley pole, a harp having a relatively large base socket pivotally receiving the upper end of said pole, and a curved rigid finger extension upon said pole positioned in said socket and engageable with the opposite sides thereof to positively limit the pivotal movement of the harp in opposite directions, and a resilient connection between said harp and said pole to normally maintain the same out of alinement.

In testimony whereof I affix my signature.

IGNAC SZAFRANSKI.